(No Model.)
C. B. ANDREWS.
SANDING DEVICE FOR RAILWAYS.
No. 528,500. Patented Oct. 30, 1894.
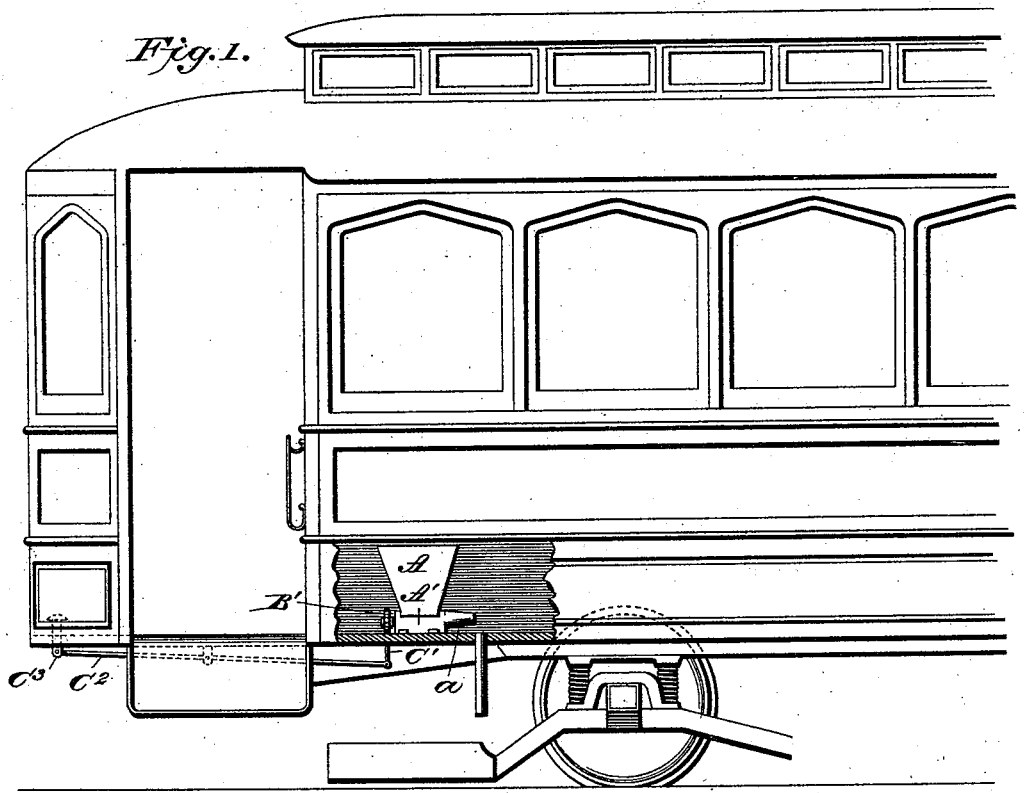
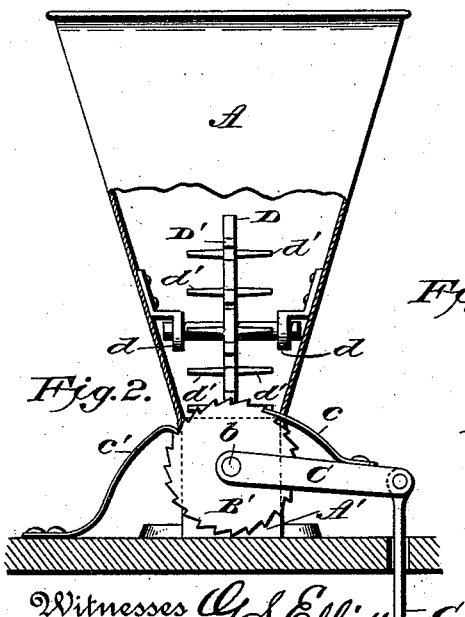
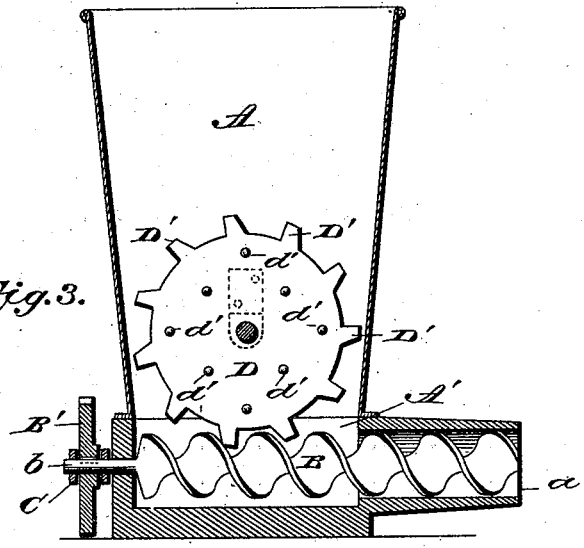
Witnesses G. S. Elliott, E. M. Johnson
Charles B. Andrews, Inventor
by — Attorney

UNITED STATES PATENT OFFICE.

CHARLES B. ANDREWS, OF LEBANON, PENNSYLVANIA, ASSIGNOR, BY DIRECT AND MESNE ASSIGNMENTS, OF SIXTEEN-TWENTIETHS TO THOMAS WILLIAMS, CLINTON J. BARR, JOHN K. RAUDENBUSH, AND SIMON P. LIGHT, OF SAME PLACE.

SANDING DEVICE FOR RAILWAYS.

SPECIFICATION forming part of Letters Patent No. 528,500, dated October 30, 1894.

Application filed June 7, 1894. Serial No. 513,818. (No model.)

*To all whom it may concern:*

Be it known that I, CHARLES B. ANDREWS, a citizen of the United States of America, residing at Lebanon, in the county of Lebanon and State of Pennsylvania, have invented certain new and useful Improvements in Sanding Devices for Railways; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a cheap, effective and convenient means for forcing sand from a receptacle and depositing the same upon the track in front of the car wheels in order to afford a better grip upon the rails; and the invention consists in providing a receptacle or tank with a stirring or agitating wheel which is actuated by a conveyer, the conveyer being rotated by mechanism which extends to the platform of the car, as will be hereinafter fully set forth and particularly pointed out in the claims.

In the accompanying drawings, Figure 1 is a side elevation of a car partly broken away to better show the application of my invention. Fig. 2 is an end view of the sanding device detached, and Fig. 3 is a sectional view.

A designates the sand tank or receptacle which is mounted upon a frame A' adapted to rest upon the floor of the car preferably beneath one of the seats forward of the front wheels. The tank or receptacle opens into the frame A', and the said frame is provided with a discharge or outlet spout $a$ in which is located one end portion of a screw or endless conveyer B. The other end portion of the screw or endless conveyer is reduced to form a shaft $b$ which passes through one of the side pieces of the frame and has rigidly keyed thereon a ratchet-wheel B'. On either side of the ratchet-wheel and connected to the shaft is a member of a bifurcated lever C carrying a spring pawl $c$ which engages with the teeth of the ratchet-wheel so that when the lever is oscillated the ratchet-wheel will be turned, backward movement being prevented by a spring pawl $c'$ which is secured to the floor of the car and engages the teeth of the ratchet-wheel, as shown in Fig. 2. To the outer or free end of the bifurcated lever C is connected a link C' which passes through the floor of the car and is connected to a lever $C^2$ pivoted to the under side of the platform of the car, the pivot of the lever $C^2$ being at such a point that the end of said lever which is connected to the link C' will overbalance the other end. The forward end of the lever $C^2$ is connected to a presser-bar $C^3$ which extends upwardly through the platform of the car as shown in Fig. 1.

From the foregoing it will be understood that to operate the screw or conveyer B it is only necessary for the motorman or driver of the car to depress the presser-bar $C^3$ which elevates the opposite end of the lever $C^2$ and through the connecting-rod or link C' elevates the lever C so that the pawl carried thereby will engage the ratchet-wheel and turn the same, and as the ratchet-wheel is connected to the screw or conveyer said screw or conveyer will be turned and force a quantity of sand out of the spout $a$ to be deposited in front of the car wheels.

In devices of this character the sand is liable to clog or pack in the tank or receptacle especially when the tanks or receptacles have converging side walls, and to prevent the arching of the sand over the screw or conveyer I provide the tank or receptacle with a stirring wheel D, said wheel being journaled in brackets $d$ attached to the inner sides of the tank. This wheel is provided with peripheral projections or teeth D' with which the screw B engages so that the rotation of the screw will turn the stirring wheel D. The stirring wheel is also provided with projecting pins or fingers $d'$ which agitate the sand and prevent the same arching when it is damp.

Having thus described my invention I do not wish to limit myself to the exact construction and arrangement herein shown and described but reserve the right to modify the invention within the scope of my claims.

I claim—

1. The combination with a car, of a sand tank or receptacle having mounted therein a stirring wheel with projecting pins or fingers and peripheral projections, a screw conveyer B adapted to engage with the peripheral projections of the stirring wheel and provided with a part $b$ forming a shaft which extends beyond the side of the frame, a ratchet-wheel mounted on the shaft $b$ and adapted to be turned by a lever C having a pawl $c$, and means for oscillating the lever, substantially as shown and for the purpose set forth.

2. In a sanding device for cars, the combination, of a tank or receptacle mounted upon a frame having a shaft-bearing at one end and a spout at the other, of a spiral conveyer B bearing at one end in the spout the other end being formed into a shaft which bears in the opening in the opposite end wall of the frame, and a stirrer D mounted in the tank or receptacle and having peripheral projections which are engaged by the spiral conveyer, substantially as shown and for the purpose set forth.

In testimony whereof I affix my signature in presence of two witnesses.

CHARLES B. ANDREWS.

Witnesses:
DAVID A. GINGRICH,
JOSEPH E. LIGHT.